A. RICE.
Car-Coupling.

No. 207,068.  Patented Aug. 13, 1878.

Witnesses:
Fred G. Dietrich
Ferdinand Dehmidt

Inventor:
Abram Rice
per Louis Bagger & Co.
his Attorneys.

UNITED STATES PATENT OFFICE.

ABRAM RICE, OF LYCIPPUS, PENNSYLVANIA.

IMPROVEMENT IN CAR-COUPLINGS.

Specification forming part of Letters Patent No. 207,068, dated August 13, 1878; application filed May 20, 1878.

*To all whom it may concern:*

Be it known that I, ABRAM RICE, of Lycippus, in the county of Westmoreland and State of Pennsylvania, have invented certain new and useful Improvements in Car-Couplings; and I do hereby declare that the following is a full, clear, and exact description thereof, which will enable others skilled in the art to which it appertains to make and use the same, reference being had to the accompanying drawings, which form a part of this specification, and in which—

Figure 1:
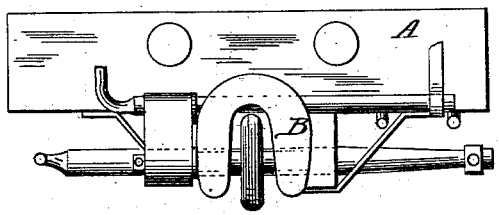
Figure 4:
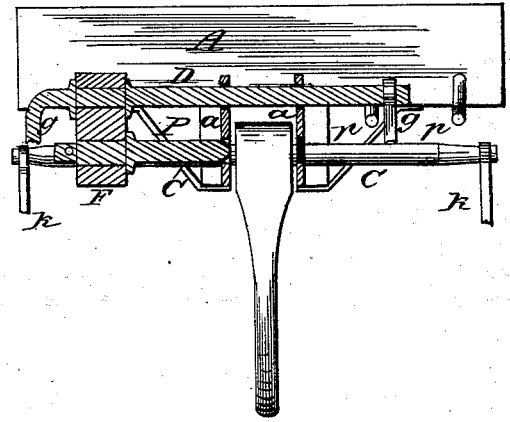
Figure 2:
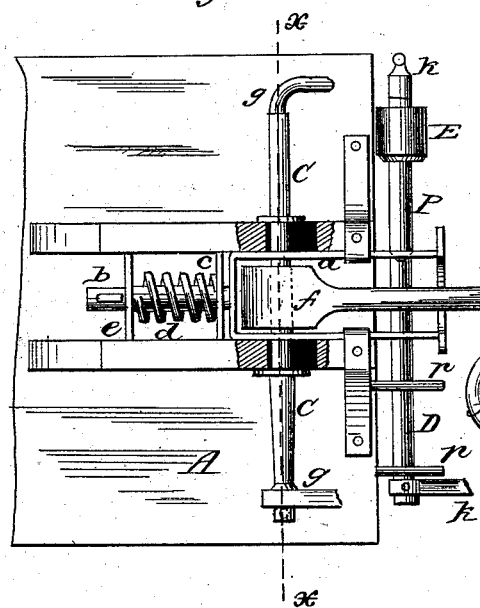
Figure 3:
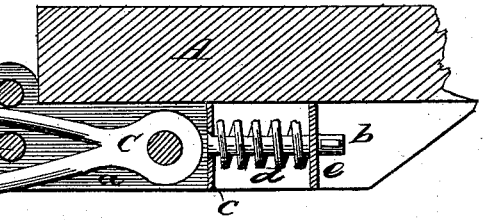

Figure 1 is a front view. Fig. 2 is a bottom plan. Fig. 3 is a longitudinal vertical section, and Fig. 4 is a cross-section on the line $x\ x$ in Fig. 2.

Similar letters of reference denote corresponding parts in all the figures.

This invention relates to certain improvements in car-couplings, especially applicable to freight and other heavy cars; and it consists in the construction and arrangement of parts by which the cars may be coupled from the side without going between them, as I shall now proceed more fully to describe.

In the drawings, A is the bottom of the car. B is the draw-head. This consists, essentially, of a bail, $a$, having at its rear end a bolt, $b$, passing through a fixed plate, $c$, rear of which it has a stout coiled spring, $d$, working against a plate, $e$, secured at its end.

C is a shaft, vibrating in bearings in the bail $a$, and sliding in slots in the draw-head proper. Upon this shaft is secured the link $f$. The ends of the shaft, which reach to the sides of the car, are provided with cranks $g\ g$, by means of which the link may at any time be raised to proper position for coupling.

D is a shaft, having a laterally-sliding motion in suitable bearings in the forward end of the bail $a$. Shaft D has a swinging arm, E, from which the coupling-pin P projects parallel to shaft D. The bail $a$ is provided with suitable perforations for the coupling-pin P. Shaft D is provided with two arms or cranks, $k\ k$, by either of which it may be operated; and $p\ p$ are two pins, projecting from the end of the car, and so arranged in relation to one of the cranks or arms $k$ that when this is turned down outside the outer pin the coupling-pin shall be locked in position; while, by releasing the arm and arranging it between the two pins, the coupling-pin may be withdrawn sufficiently to uncouple, but not enough to get out of its bearings, the result of which would be that, being attached to a swinging arm, it would fall or swing down, and thus cause some trouble in readjusting.

From the foregoing description, taken in connection with the drawings hereto annexed, the operation of my invention will be readily understood. When the cars come together, the link of one is raised so as to enter the draw-head of the next, when the coupling-pin can be readily inserted from the side and locked in the manner described. When a car having my improved coupling is to be coupled with one having the old-fashioned pin and link, an ordinary twisted link can be used.

My improved coupling obviates, as will be readily seen, the necessity of going between the cars for the purpose of coupling or uncoupling, thus doing away with all danger to life and limb.

Having thus described my invention, I claim and desire to secure by Letters Patent of the United States—

1. The combination of the sliding bail or draw-head $a$, the shaft C, carrying the link $f$, and having arms or cranks $g\ g$, the fixed plate $c$, bolt $b$, attached to bail $a$, spring $d$, shaft D, having swinging arm F, coupling-pin P, attached to the latter, and pins $p\ p$, all arranged and operating substantially as and for the purpose herein set forth.

2. In a car-coupling, the coupling-pin P, secured to the swinging arm of a horizontal bar sliding laterally in bearings in the draw-head, substantially as and for the purpose herein shown and specified.

In testimony that I claim the foregoing as my own I have hereto affixed my signature in presence of two witnesses.

ABRAM RICE.

Witnesses:
GEORGE FORTNEY,
JOSEPH C. STOUFFER.